United States Patent [19]

Matsushima

[11] Patent Number: 4,962,433
[45] Date of Patent: Oct. 9, 1990

[54] VIDEO PRINTER HAVING CONVERTING MEANS FOR CONVERTING A VIDEO SIGNAL INTO DIGITAL PICTURE DATA

[75] Inventor: Akira Matsushima, Tokyo, Japan

[73] Assignee: Seikosha Co., Ltd., Tokyo, Japan

[21] Appl. No.: 203,224

[22] Filed: Jun. 6, 1988

[30] Foreign Application Priority Data

Jun. 11, 1987 [JP] Japan .................. 62-145608

[51] Int. Cl.$^5$ .................. H04N 5/76; H04N 5/20
[52] U.S. Cl. .................. 358/335; 358/164; 358/429; 358/455
[58] Field of Search .................. 358/164, 284, 80, 332, 358/224, 335, 429, 455

[56] References Cited

U.S. PATENT DOCUMENTS

| | | | |
|---|---|---|---|
| 3,752,905 | 8/1973 | Schneider | 358/164 |
| 4,402,015 | 8/1983 | Yamada | 358/284 |
| 4,473,849 | 9/1984 | Cool | 358/244 |
| 4,513,278 | 4/1985 | Seitz | 358/164 |
| 4,679,674 | 7/1987 | Sugiura et al. | 358/164 |
| 4,742,397 | 5/1988 | Ferla et al. | 358/244 |
| 4,786,968 | 11/1988 | Kutner | 358/164 |
| 4,794,460 | 12/1988 | Shiota | 358/244 |

*Primary Examiner*—Robert L. Richardson
*Attorney, Agent, or Firm*—Jordan and Hamburg

[57] ABSTRACT

A video printer utilizing a plurality of converting tables corresponding to a plurality of gradation characteristics, each for converting picture data into recording data on the basis of its gradation characteristic, selects one of the converting tables, and performs recording on the basis of the converting table selected, thereby producing recorded pictures meeting any requirement.

4 Claims, 4 Drawing Sheets

F I G. 3
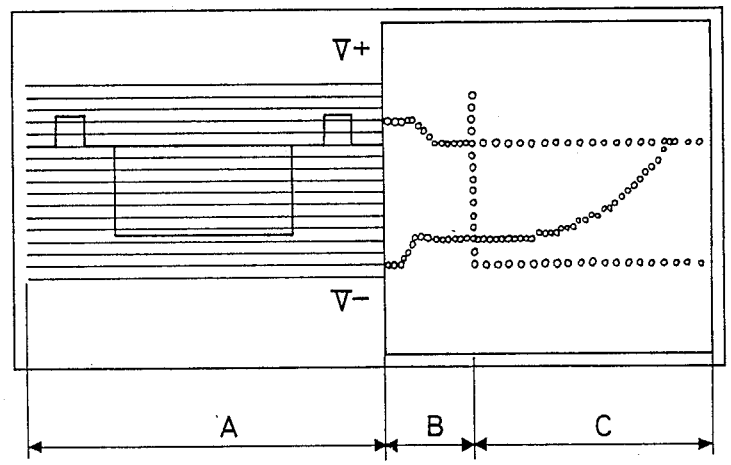

VIDEO PRINTER HAVING CONVERTING MEANS FOR CONVERTING A VIDEO SIGNAL INTO DIGITAL PICTURE DATA

BACKGROUND OF THE INVENTION

In video printers for recording television pictures in hard copy form, a technique of enhancing the picture quality is disclosed in Japanese Patent Application Laid-Open No. 61-157191. This technique includes calculating the brightness distribution of picture data, using a compensation control circuit for determining the gradation level indicative of the density corresponding to the distribution calculated, and allocating fine gradations to a portion where the brightness is concentrated. Specifically, for example, when the brightness distribution is concentrated on the dark side, the allocation of gradation for the dark side is fine, while the allocation of gradation for the light side is coarse. Consequently, a dark portion of the picture is printed with fine gradations, thereby enhancing the picture quality.

The foregoing technique provides good picture quality with respect to some specific pictures. For example, where the picture is "a close-up of the face of a white-complexioned woman" whose light portion is very large in proportion, the brightness distribution is concentrated on the light side as shown in FIG. 4. Accordingly, the gradation curve after compensation is dull in the variation of gradation on the white side as shown in FIG. 5 by L1, so that the face of the woman is printed with fine gradations without a false representation, whereby a good hard copy can be produced.

For picture data in a variety of specialized fields, however, the degree of picture quality expected for hard copies does not depend on the brightness distribution being large or small, and of course, a high degree of picture quality should not depend on a good gradation characteristic of a portion where the brightness distribution is concentrated. Oppositely, in many cases it is necessary to consider a narrow portion where the brightness distribution is not concentrated. In such cases, it is necessary to perform printing-out while enhancing the gradation characteristic of the portion under consideration even if the gradation characteristics of other portions may be degraded.

For example, where the picture includes dark portions very large in proportion as a whole, as is "the face of a white-complexioned woman with a dark and broad background", its brightness distribution is concentrated on the dark portions, as opposed to the case of FIG. 4. Accordingly, the gradation curve would be like L2 of FIG. 5, that is, the variation of gradation on the black side becomes dull, with the variation of gradation on the white side very sharp. Therefore, the gradation characteristic of the essential woman's face becomes coarse, resulting in a false representation, so that as far as attention is paid to the woman's face, the resulting picture cannot be said to have a high degree of picture quality.

In such cases as above, the foregoing conventional technique produces a reverse effect.

The present invention allows the selection of gradation characteristic as need arises, thereby improving the gradation property of a portion seeking a desirable brightness in compliance with the object of a printout.

BRIEF DESCRIPTION OF THE DRAWINGS

FIG. 3 is an explanatory diagram showing an example of a reference voltage/gradation characteristic display section.

DESCRIPTION OF THE PREFERRED EMBODIMENTS

Figure 1:
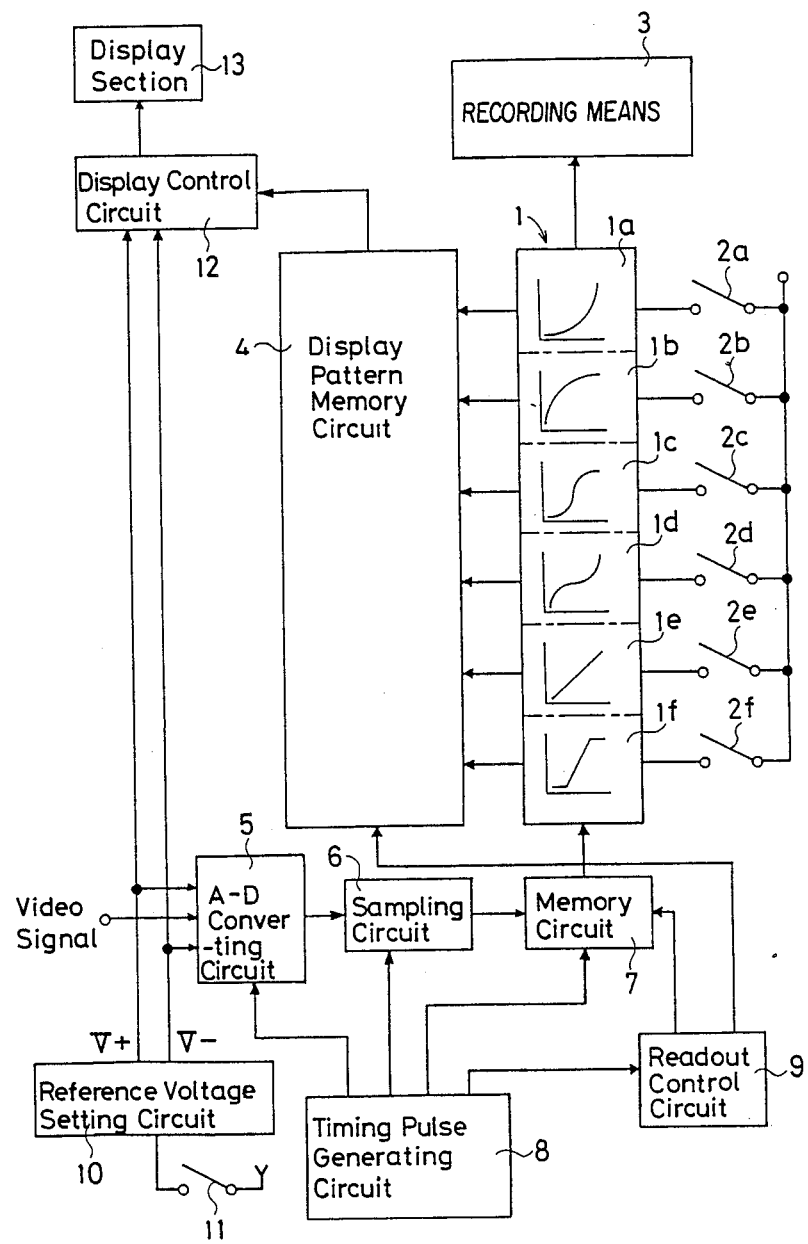
FIG. 1 is a block diagram showing one embodiment of the present invention.

In FIG. 1, 1 designates a ROM accommodating six kinds of converting tables 1a-1f which correspond to six kinds of gradation characteristics a-f. Each gradation characteristic graph shows the step of gradation on the horizontal axis and the density of recording on the vertical axis. Manual switches 2a-2f serve as selecting means for selection of individual converting tables, and a recording means 3 is provided for printing out a picture on the basis of the converting table selected. A display pattern memory circuit 4 consisting of a ROM stores display patterns for display of the individual gradation characteristics. An A-D converting circuit 5 converts a video signal passing through an auto gain control circuit into digital picture data. A sampling circuit 6 and a memory circuit 7 are provided for the picture data. A timing pulse generating circuit 8 and a readout control circuit 9 are also provided. A reference voltage setting circuit 10 sets reference voltages V+ and V−, these voltages being used at the time of A−D conversion of the video signal. A switch 11 switches the reference voltages between an auto mode and a manual mode, and a display control circuit 12 causes a display means 13 to display the gradation characteristic and the setting range of the reference voltage.

Figure 2:
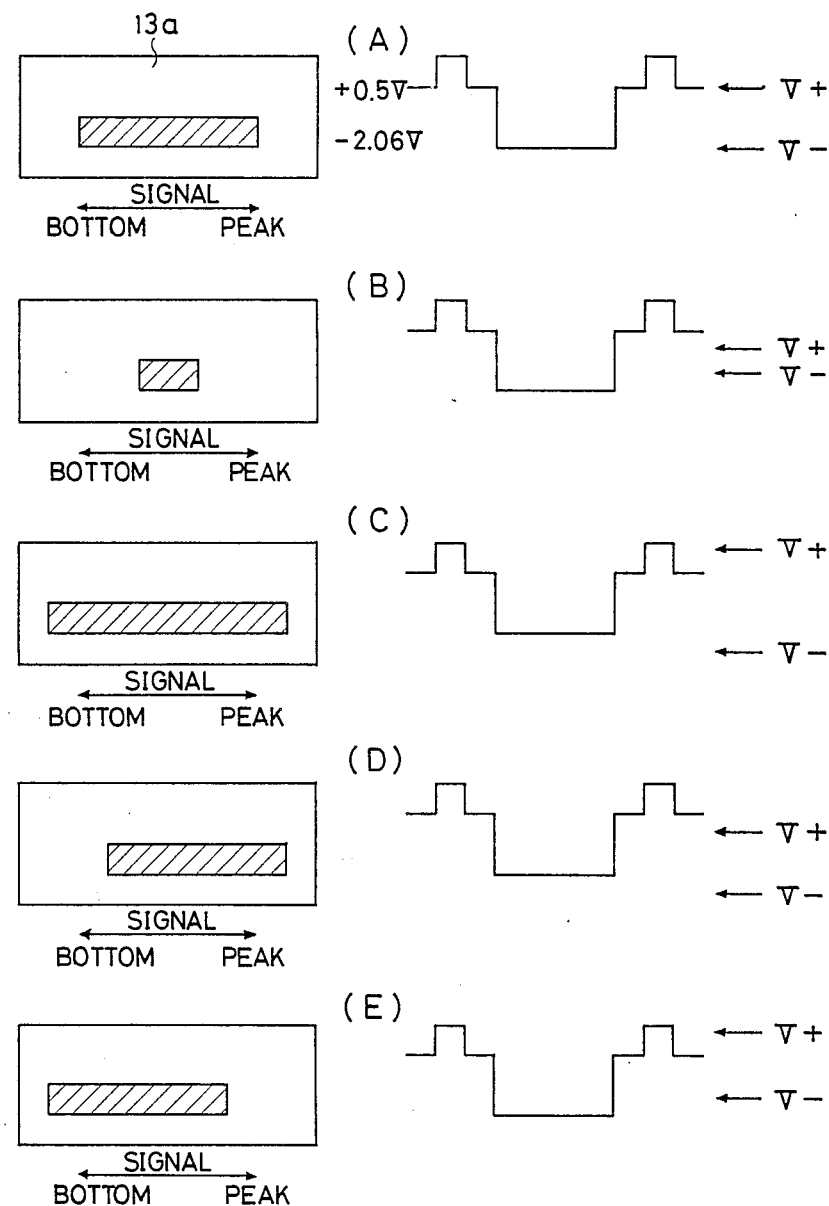
FIGS. 2(A)-2(E) are explanatory diagrams showing an example of a reference voltage display means.
Figure 4:
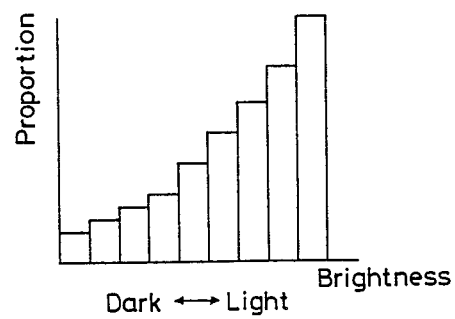
FIGS. 4 and 5 are explanatory diagrams showing a brightness distribution and a gradation characteristic therefor, respectively, in a conventional video printer.
Figure 5:
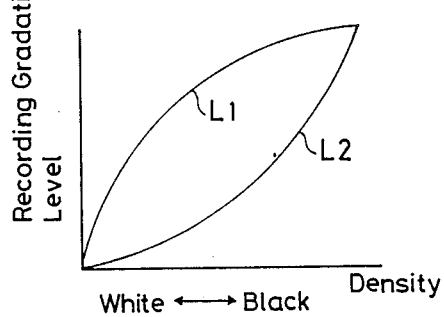

The operation will now be described. Setting of the reference voltages and display operation will first be described. The switch 11 is controlled to select either the auto mode or the manual mode for the reference voltages. When the auto mode is selected, as shown in FIG. 2(A), the reference voltages V+ and V− are automatically set, respectively, to an upper limit voltage, +0.5V and a lower limit voltage, −2.06V in relation to the video signal. Concurrently, the range of reference voltage is displayed on a portion of the display means 13, or by a liquid crystal display section 13a, as shown in FIG. 2(A). The resulting display in this case indicates that signal components from the lower limit (BOTTOM) to the upper limit (PEAK) of the video signal will be A-D converted.

When the manual mode is selected by the switch 11, it is possible to arbitrarily set the reference voltages using the reference voltage setting circuit 10. If the reference voltages are set as shown in FIGS. 2(B) through 2(E), the corresponding indications are presented.

Then, a desirable gradation characteristic is selected using the switches 2a-2f. When desired to perform recording on the basis of, for example, gradation characteristic a, switch 2a is closed to select converting table 1a. By this selection, the display pattern of gradation characteristic a is selected from the display pattern memory circuit 4, and displayed on a portion (not shown) of the display means 13.

When recording operation is started, on the basis of the reference voltages set as above, the video signal is converted by the A-D converting circuit 5 into picture data. The picture data are then sampled by the sampling circuit 6 and stored in the memory circuit 7. The thus-stored picture data are sequentially read out in response to the output of the readout control circuit 9, and converted on the basis of converting table 1a selected into recording data, and then, recording is performed in the recording section 3.

In the foregoing process, by setting the reference voltages in accordance with the picture demanded, it is possible to produce a recorded picture whose required portions are clear.

Accordingly, when printing out, for example, "the face of a white-complexioned woman with a dark background", if converting table 1a is used as described above, the variation of gradation on the white side becomes dull, so that the woman's face portion can be printed out clearly. Further, if, concurrently, setting of the reference voltages is shifted toward the white side of the video signal as shown in FIG. 2(D), the white face becomes clearer. Accordingly, although the picture quality of the background is degraded, the resulting picture with the woman's face alone made clear can meet the outstanding needs and accomplish the printing.

In this way, since any desirable gradation characteristic can be selected, the picture can be printed out with its required portions made clear as needed, so that whatever type of requirement can be met.

Display of the gradation characteristic and reference voltages set may be made as shown in FIG. 3. In this Figure, section A is a display section, including a printed screen or the like, for the video signal waveform, and sections B and C are display sections made of a plasma display unit or the like, section C being for the gradation characteristic, and displaying the gradation characteristic a of FIG. 1. Section B displays both the reference voltages set, V+ and V−, and the correlation with the video signal displayed in section A. Specifically, the display action of section B is controlled by the output of the reference voltage setting circuit 10 shown in FIG. 1, whereas the display action of section C is controlled by the output of the display pattern memory circuit 4.

The present invention uses a plurality of converting tables corresponding to a plurality of gradation characteristics, each for converting picture data into recording data on the basis of its gradation characteristic, selects one converting table, and performs recording on the basis of the recording data converted by the converting table selected. Therefore, it is possible to produce recorded pictures meeting any requirement. Especially, the present invention is very effective where specified portions of the picture are desired to be made clear.

Further, since the gradation characteristic used in converting the picture data into the recording data is displayed, the gradation characteristic presently selected can be visually confirmed, so that setting of the optimum gradation characteristic can be easily performed.

Further, since the reference voltages used in converting the video signal into the digital picture data are made arbitrarily setable, these voltages can be fine-adjusted depending on the object of printing, so that recorded pictures needed in individual specialized fields can be very easily produced.

Further, since the reference voltages are made switchable between the auto mode allowing standard setting and the manual mode allowing arbitrary setting, ordinary pictures can be printed out in the auto mode without requiring any adjustment.

I claim:

1. A video printer having converting means for converting a video signal into digital picture data comprising:
    reference voltage setting means for variably setting a lower limit and an upper limit of a reference voltage used for converting a video signal into digital picture data;
    converting means for converting the video signal into the digital picture data, within a range between the lower limit and the upper limit of the reference voltage;
    memory means for storing a plurality of converting tables, each corresponding to a different gradation characteristic;
    selecting means for selecting one of said converting tables; and
    recording means for converting said digital picture data into recording data having different areas with different brightnesses depending upon the selected converting table and for recording a video image according to said recording data.

2. A video printer having converting means for converting a video signal into digital picture data according to claim 1; wherein said reference voltage setting means includes switch means for switching said reference voltage setting means between an automatic mode which generates predetermined reference voltages, and a manual mode which permits manual setting of reference voltages.

3. A video printer having converting means for converting a video signal into digital picture data comprising:
    reference voltage setting means for variably setting a lower limit and an upper limit of a reference voltage used for converting a video signal into digital picture data;
    converting means for converting the video signal into the digital picture data within a range between the lower limit and the upper limit of the reference voltage;
    memory means for storing a plurality of converting tables, each corresponding to a different gradation characteristic;
    selecting means for selecting one of said converting tables;
    recording means for converting said digital picture data into recording data having different areas with different brightness depending upon the selected converting table and for recording a video image according to said recording data; and
    display means for displaying the lower limit and the upper limit of the reference voltage together with the voltage range of the video signal.

4. A video printer having converting means for converting a video signal into digital picture data comprising:
    reference voltage setting means for setting a lower limit and an upper limit of a reference voltage used for converting a video signal into digital picture data;
    converting means for converting the video signal into the digital picture data within a range between the lower limit and the upper limit of the reference voltage;

memory means for storing a plurality of converting tables, each corresponding to a different gradation characteristic;

selecting means for selecting one of said converting tables;

recording means for converting said digital picture data into recording data having different areas with different brightnesses depending upon the converting table and for recording a video image according to said recording data; and display means for displaying the lower limit and the upper limit of the reference voltage and the voltage range of the video signal together with the gradation characteristic line of the selected converting table.

* * * * *